(12) United States Patent
Schultz et al.

(10) Patent No.: US 11,639,088 B2
(45) Date of Patent: May 2, 2023

(54) VEHICLE HALF DOOR ASSEMBLIES

(71) Applicants: Jason E Schultz, Clarkston, MI (US); Robert J Reagle, Sterling Heights, MI (US)

(72) Inventors: Jason E Schultz, Clarkston, MI (US); Robert J Reagle, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 183 days.

(21) Appl. No.: 17/155,502

(22) Filed: Jan. 22, 2021

(65) Prior Publication Data

US 2021/0237544 A1  Aug. 5, 2021

Related U.S. Application Data

(60) Provisional application No. 62/967,905, filed on Jan. 30, 2020.

(51) Int. Cl.
*B60J 5/04* (2006.01)
*B60R 13/02* (2006.01)

(52) U.S. Cl.
CPC ........... *B60J 5/0486* (2013.01); *B60J 5/0408* (2013.01); *B60J 5/0463* (2013.01); *B60R 13/0243* (2013.01); *B60J 5/0476* (2013.01)

(58) Field of Classification Search
CPC ...... B60J 5/0486; B60J 5/0487; B60J 5/0408; B60J 5/0463; B60J 5/0468; B60R 13/0243
USPC .............. 296/146.7, 146.5, 146.14, 148, 149
See application file for complete search history.

(56) References Cited

U.S. PATENT DOCUMENTS

| | | | |
|---|---|---|---|
| 2,567,153 A * | 9/1951 | Jackson | B60J 1/14 49/463 |
| 4,843,762 A | 7/1989 | Grier et al. | |
| 5,516,073 A * | 5/1996 | McMahan | B60R 1/06 248/549 |
| 5,857,731 A | 1/1999 | Heim et al. | |
| 6,036,255 A | 3/2000 | Lester et al. | |
| 6,036,256 A | 3/2000 | Hilliard et al. | |
| 6,886,881 B1 * | 5/2005 | Henderson | B60J 5/0476 49/502 |
| 7,634,873 B2 | 12/2009 | Ruppert et al. | |
| 10,363,798 B2 | 7/2019 | Kleinhoffer | |
| 11,225,128 B2 * | 1/2022 | Schultz | B60J 5/0463 |
| 2004/0021343 A1 * | 2/2004 | Dobbs | B60J 5/0408 296/201 |
| 2005/0110298 A1 * | 5/2005 | Fin | B60J 5/0487 296/146.5 |

(Continued)

FOREIGN PATENT DOCUMENTS

DE 10237436 B4 * 2/2008 ............ B60J 5/0406

*Primary Examiner* — Jason S Morrow
*Assistant Examiner* — Wenwei Zhuo
(74) *Attorney, Agent, or Firm* — Ralph E Smith

(57) ABSTRACT

A multi-component door assembly for a vehicle includes a lower door portion rotatably coupled to a body of the vehicle and including at least one receiving aperture defined therein, and an upper door portion selectively removable from the lower door portion and including at least one post configured to be received within the at least one receiving aperture for removably coupling the upper door portion to the lower door portion. At least one trim cap is configured to selectively cover and conceal the at least one receiving aperture.

12 Claims, 6 Drawing Sheets

(56) References Cited

U.S. PATENT DOCUMENTS

2007/0261313 A1* 11/2007 Ruppert .................. B60J 5/0406
  49/502
2007/0262607 A1   11/2007 Saito
2017/0203640 A1*  7/2017 Rafeld ................... B60J 5/0487
2021/0283998 A1*  9/2021 Bell ......................... B60J 5/048

* cited by examiner

US 11,639,088 B2

VEHICLE HALF DOOR ASSEMBLIES

CROSS REFERENCE TO RELATED APPLICATION

This application claims the benefit of U.S. Provisional App. No. 62/967,905, filed Jan. 30, 2020, the contents of which are incorporated herein by reference thereto.

FIELD

The present application relates generally to vehicle door systems and, more particularly, door systems for concealing connection areas between a lower half door and a removable upper half door.

BACKGROUND

It is known in the motor vehicle art to provide a convertible top, which may be folded back or removed from the vehicle. In one example, the convertible top is constructed of a hard material (e.g., referred to as a hard top) or a flexible fabric (e.g., referred to as a soft top) and is folded back to a storage position or otherwise removed from an installed position. Such convertible tops provide a user with the benefit of open air driving while affording available protection in the event of adverse weather conditions. Additionally, some convertible top systems provide doors with removable window assemblies, further providing the benefit of open air driving while also providing protection from objects and debris while the vehicle is in motion. However, removal of the window assemblies may leave connecting components, such as pin retainers, exposed. Thus, while such systems do work well for their intended purpose, it is desirable to provide improvements in the relevant art.

SUMMARY

According to one example aspect of the invention, a multi-component door assembly for a vehicle is provided. In one exemplary implementation, the door assembly includes a lower door portion rotatably coupled to a body of the vehicle and including at least one receiving aperture defined therein, and an upper door portion selectively removable from the lower door portion and including at least one post configured to be received within the at least one receiving aperture for removably coupling the upper door portion to the lower door portion. At least one trim cap is configured to selectively cover and conceal the at least one receiving aperture.

In addition to the foregoing, the described door assembly may include one or more of the following features: wherein the at least one trim cap is slidingly coupled to the lower door portion and moves between a retracted position where the at least one receiving aperture is open to receive the at least one post, and a deployed position where the at least one trim cap covers and conceals the at least one receiving aperture; wherein the lower door portion includes a door trim substrate coupled to a door structure, wherein the at least one receiving aperture is formed in an upper surface of the door trim substrate; wherein each trim cap of the at least one trim cap includes a main body having one or more pins extending outwardly therefrom, wherein the one or more pins are slidingly received within a track formed in the lower door portion; and wherein each trim cap further includes a tab coupled to the main body, the tab configured to be grasped by a user to slide the trim cap between the retracted and deployed positions.

In addition to the foregoing, the described door assembly may include one or more of the following features: wherein the upper door portion further includes a trim cap storage container configured to receive and store the at least one trim cap; wherein the storage container includes a lid or flap to selectively enclose a storage compartment defined by the trim cap storage container; wherein the upper door portion includes a frame, a window supported within the frame, and an exterior fabric member coupled to the frame; wherein the trim cap storage container is coupled to the frame; and wherein the trim cap storage container is coupled to a fabric reinforcement member, which is coupled to an inboard side of the exterior fabric member.

In addition to the foregoing, the described door assembly may include one or more of the following features: wherein the at least one post comprises a forward post and a rearward post; wherein the at least one receiving aperture includes a first receiving aperture to receive the forward post, and a second receiving aperture to receive the rearward post; and wherein the at least one trim cap comprises a first trim cap configured to removably couple within first receiving aperture, and a second trim cap configured to removably couple within the second receiving aperture.

According to another example aspect of the invention, a vehicle is provided. In one exemplary implementation, the vehicle includes a body and a pair of multi-component door assemblies removably coupled to the body. Each multi-component door assembly includes a lower door portion movably coupled to a body of the vehicle and including at least one receiving aperture defined therein, and an upper door portion selectively removable from the lower door portion and including at least one post configured to be received within the at least one receiving aperture for removably coupling the upper door portion to the lower door portion. At least one trim cap is configured to selectively cover and conceal the at least one receiving aperture.

In addition to the foregoing, the described vehicle may include one or more of the following features: a pair of multi-component rear door assemblies removably coupled to a rear of the vehicle body; wherein the upper door portion further includes a trim cap storage container configured to receive and store the at least one trim cap; and wherein the at least one trim cap is slidingly coupled to the lower door portion and moves between a retracted position where the at least one receiving aperture is open to receive the at least one post, and a deployed position where the at least one trim cap covers and conceals the at least one receiving aperture.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for multi-component door assemblies. In the example embodiments, the systems include a half door assembly having an upper door portion that is selectively removable from a lower door portion. The lower door portion includes receiving apertures to receive a portion of the upper door portion for coupling therebetween. In one embodiment, when the upper door portion is removed, the receiving apertures are covered and concealed by one or more trim caps, which can be stored in storage pocket formed in the lower door portion. In another embodiment, retractable trim caps are configured to slide into position across the receiving apertures when the upper door portion is removed to thereby cover and conceal receiving apertures.

Figure 1:
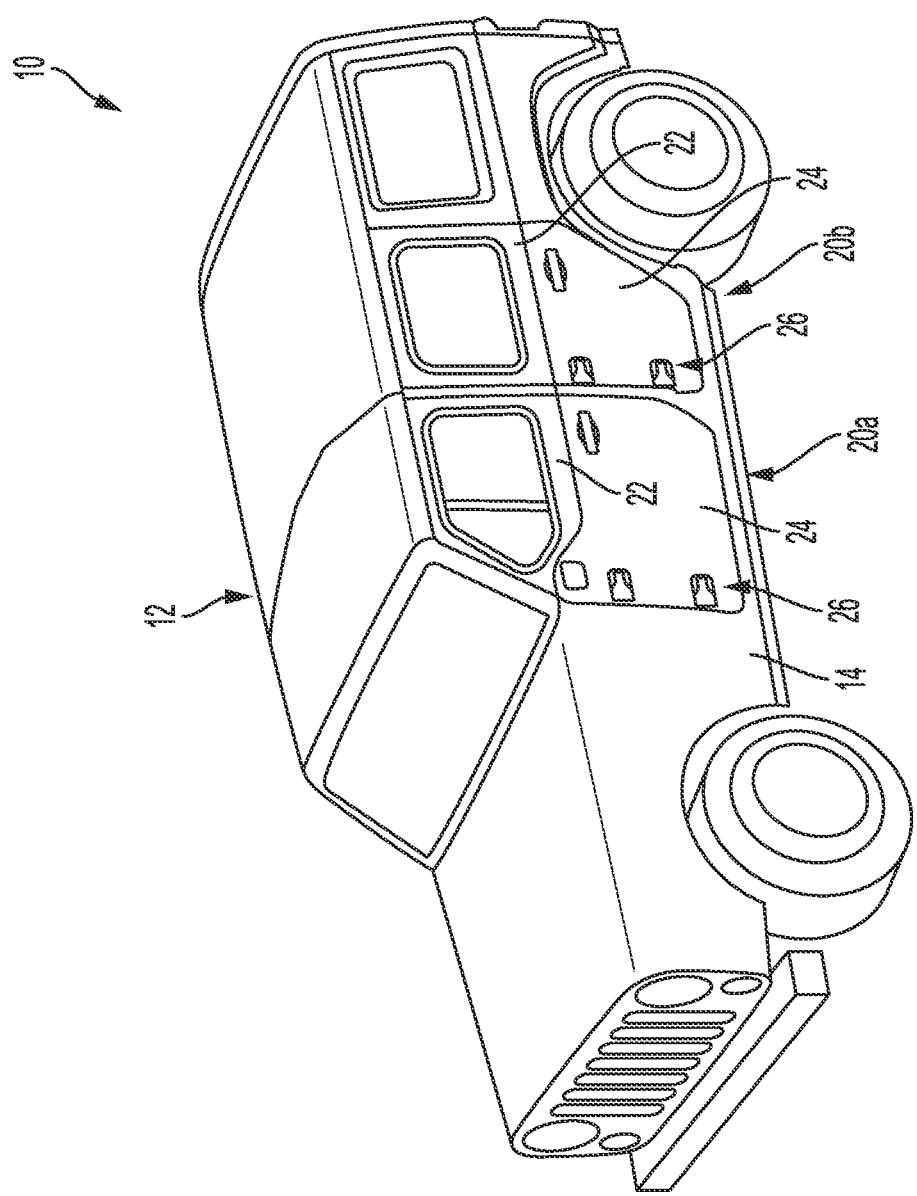
FIG. 1 is a perspective view of an example vehicle with multi-component door assemblies in accordance with the principles of the present disclosure.

With initial reference to FIG. 1, a vehicle 10 having a convertible top system 12 in accordance with the principles of the present disclosure is illustrated. In the example embodiment, the convertible top system 12 is a hard top system, however, it will be appreciated that convertible top system 12 may be a soft top or other system. In the example implementation, the vehicle 10 includes a body 14 and selectively removable door assemblies 20 removably coupled thereto. Additionally, each removable door assembly 20 comprises a removable upper half or upper door portion 22, and a lower half or lower door portion 24, which may also be removably coupled to the body 14. It will be appreciated that the term "half" does not necessarily reflect the actual proportion of the total door assembly.

As shown in FIG. 1, vehicle 10 includes a pair of front removable doors 20a and a pair of rear removable doors 20b, although it will be appreciated that vehicle 10 can have any suitable number of doors, some or all of which include the removable upper door portion 22. In the example embodiment, the lower door portion 24 is coupled to the vehicle 10 via one or more hinges 26 to permit pivoted movement of the door assembly relative to the remainder of the vehicle body 14 between open and closed positions. In this regard, the vehicle body 14 defines a door opening 16 to be selectively enclosed by the door assembly for ingress and egress of the passenger compartment. The upper door portion 22 is removably or releasably carried by the lower door portion 24 such that the upper door portion 22 may be removed and recoupled as desired. While the door assembly is shown in two parts, it will be appreciated that door may have any number or removable sections.

Figure 3:
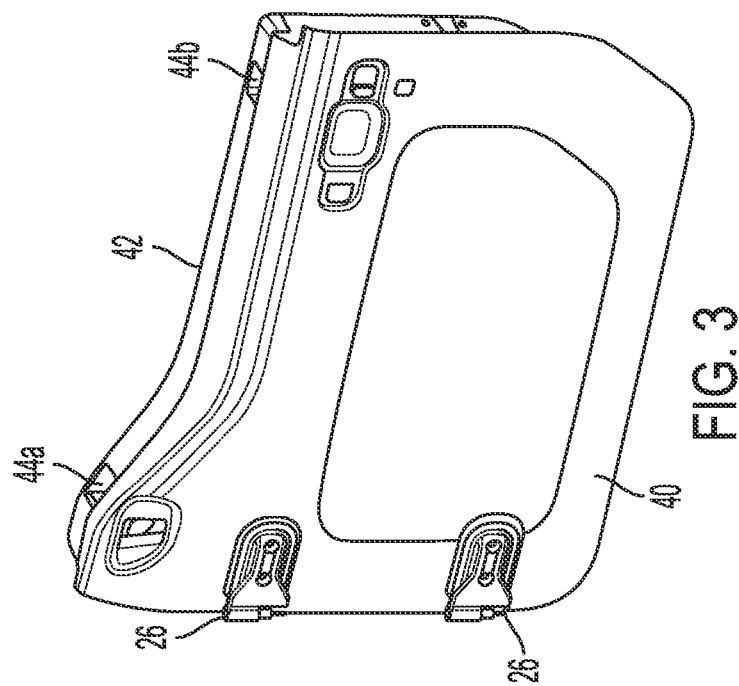
FIG. 3 is a perspective view of a lower portion of one of the door assemblies of FIG. 1, in accordance with the principles of the present disclosure.
Figure 2:
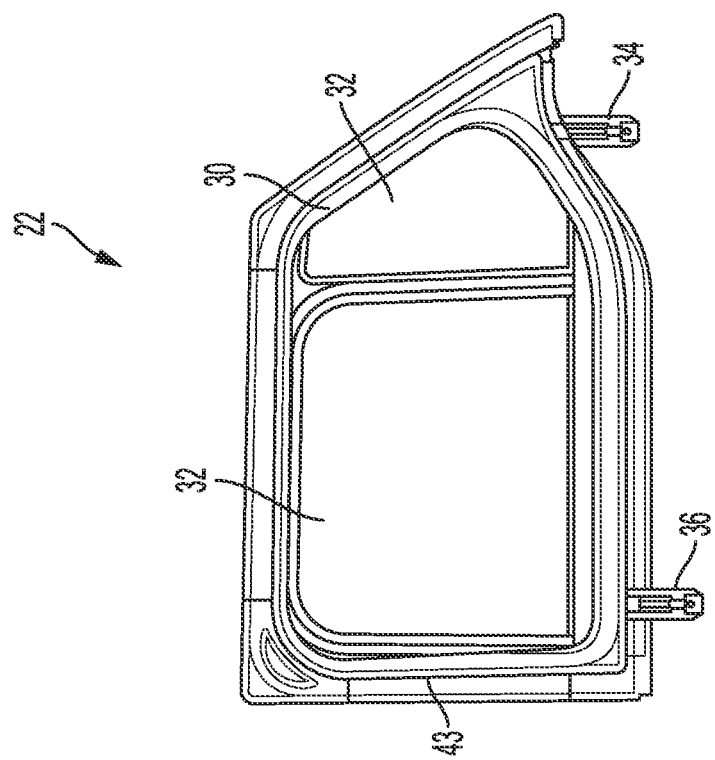
FIG. 2 is a side view of an upper portion of one of the door assemblies of FIG. 1, in accordance with the principles of the present disclosure.
Figure 4:
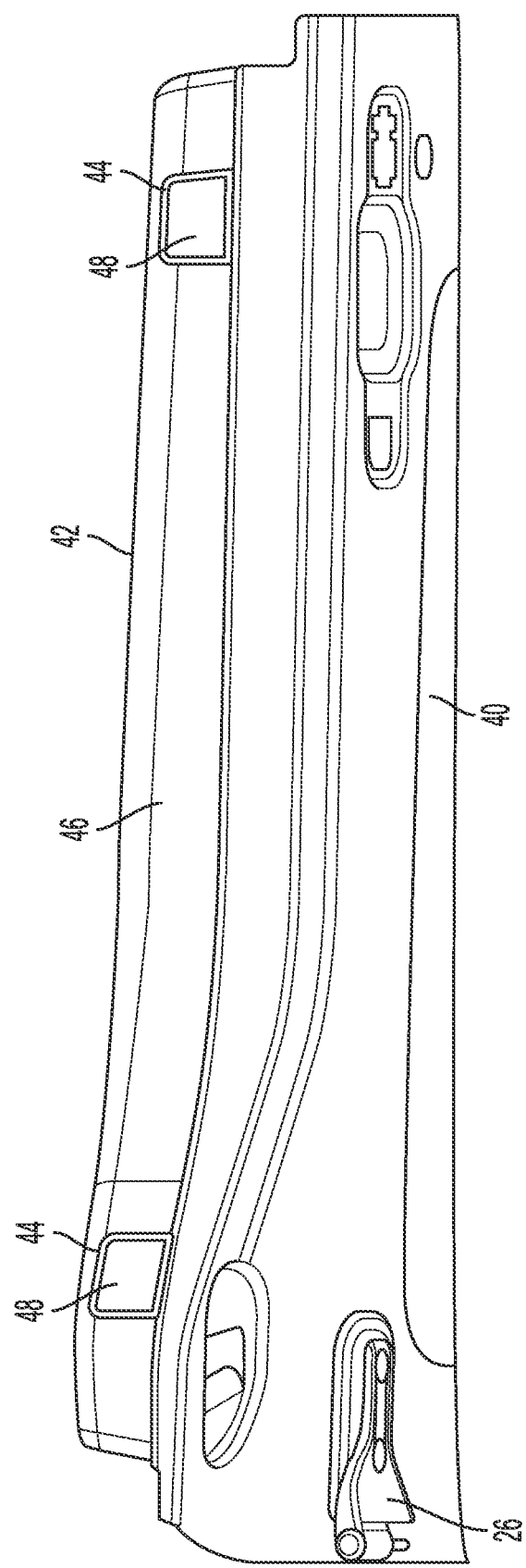
FIG. 4 is an enlarged view of the lower door portion of FIG. 3 with example trim caps installed in accordance with the principles of the present disclosure.

With additional reference to FIGS. 2 and 3, in the example embodiment, upper door portion 22 generally includes a frame 30, a window 32, a forward post 34, and a rearward post 36, as shown in FIG. 3. As shown in FIG. 4, lower door portion 24 generally includes a door structure 40 (e.g., door sheet metal) and a door trim substrate 42. When the upper door portion 22 is installed on the lower door portion 24, the portions 22, 24 move together and function as a solid, single part door. Further, when window 32 or other component covers the window opening in frame 30, the door assembly is configured to fully cover and close the door opening 16 of vehicle 10. To inhibit or prevent water and airborne debris from entering the vehicle 10, one or more seals 43 are provided between the door assembly and the vehicle 10. The seals 43 may be carried by one or both of the doors 20 and the vehicle 10, and are compressed between the door assembly 20 and vehicle 10 when the door assembly is in the closed position. However, when desired, the upper door portion 22 is selectively removable from the lower door portion 24 to provide an intermediate open air configuration that still provides a portion of the entire removable door assembly 20.

In the example embodiment, the door trim substrate 42 defines one or more receiving apertures 44 configured to receive a portion of the upper door portion 22 for coupling the upper door portion 22 to the lower door portion 24. In the illustrated example, the door trim substrate 42 includes a forward receiving aperture 44a and a rearward receiving aperture 44b. The forward receiving aperture 44a is configured to receive the forward post 34, and the rearward receiving aperture 44b is configured to receive the rearward post 36. Additionally, the door trim substrate 42 defines an upper surface 46 configured to receive and support the upper door portion 22 when assembled to the lower door portion 24.

Figure 5:
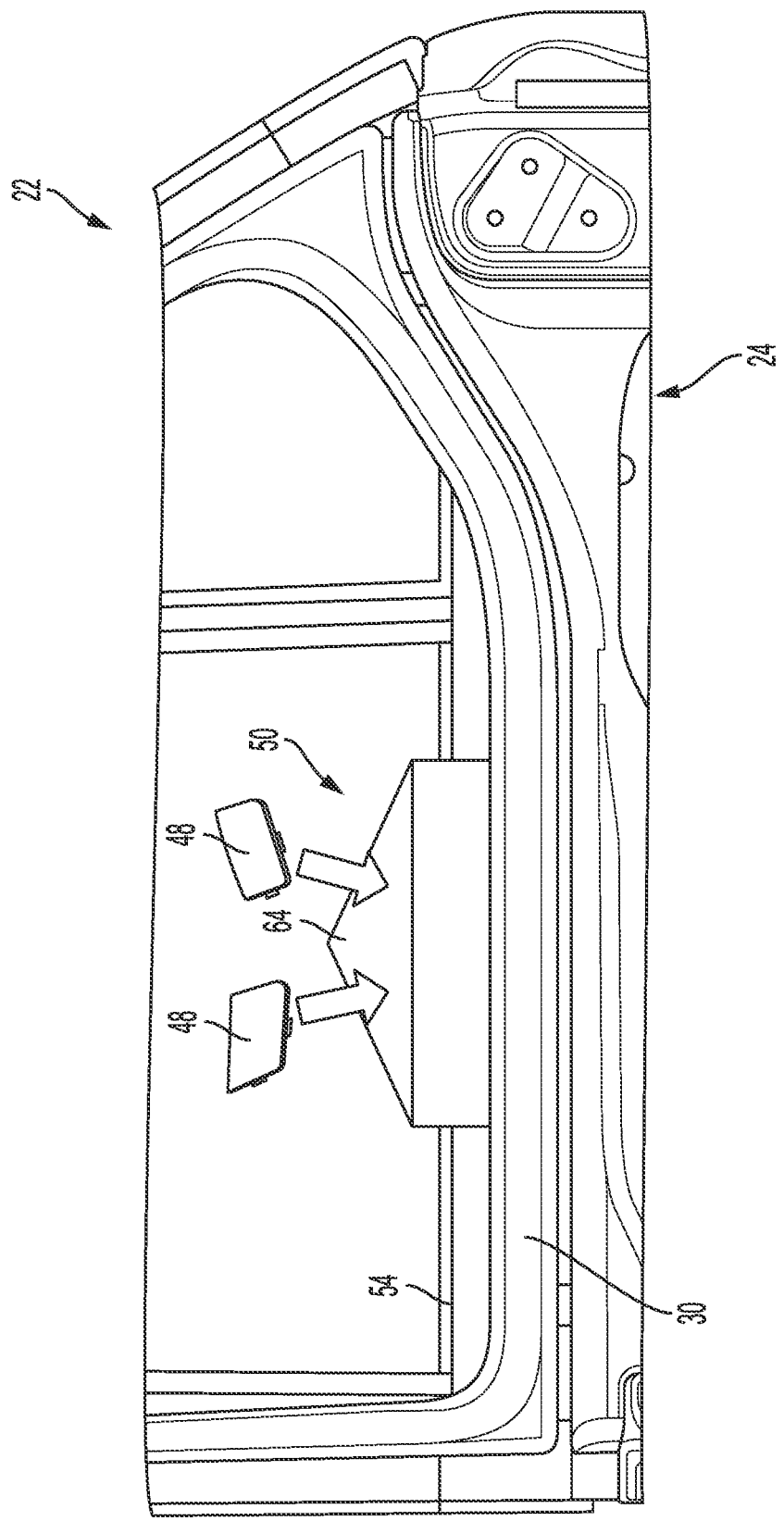
FIG. 5 is a side view of a portion of one of the door assemblies of FIG. 1, in accordance with the principles of the present disclosure.
Figure 6:
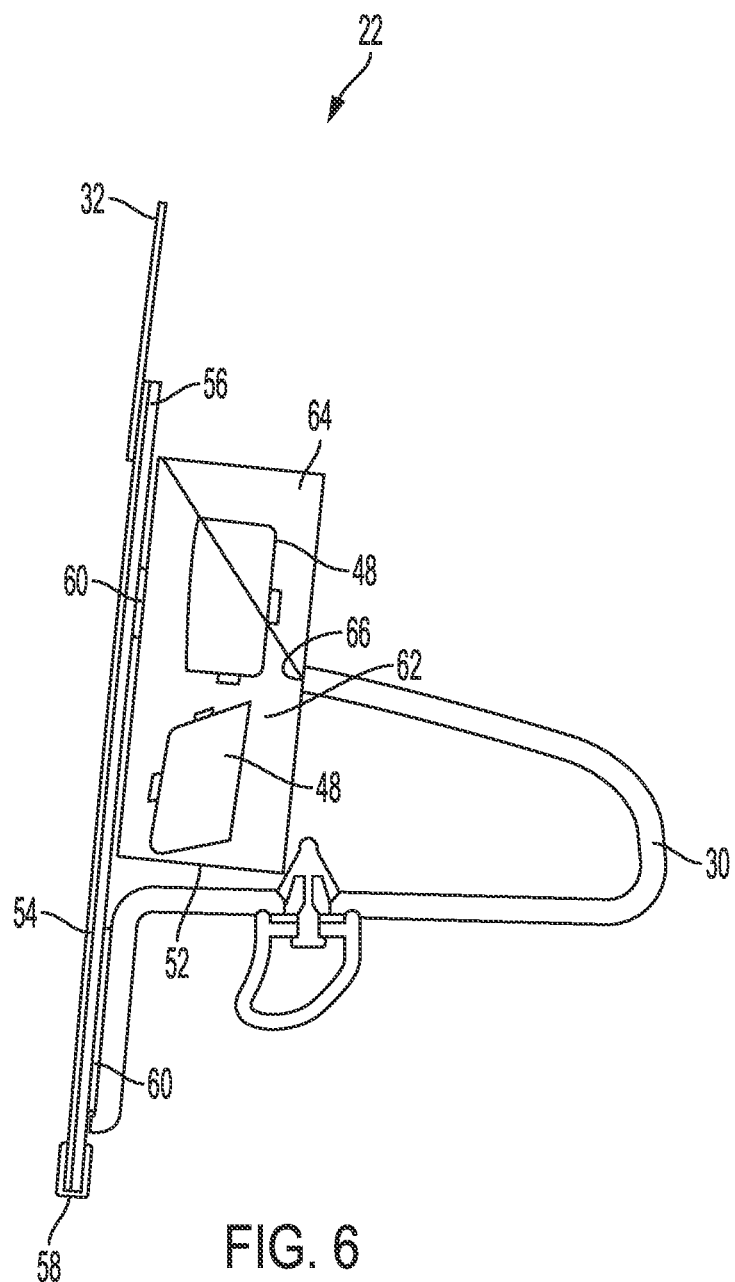
FIG. 6 is a cross-sectional view of the door assembly of FIG. 5, in accordance with the principles of the present disclosure.

With additional reference to FIGS. 4-6, in one embodiment, the lower door portion 24 includes one or more trim caps 48 configured to be disposed within one of the receiving apertures 44 to thereby cover and conceal the receiving aperture 44 when the upper door portion 22 is removed. In this way, the trim caps 48 are sized and shaped to couple within aperture 44 (e.g., snap in place) and provide an aesthetically pleasing, contiguous or substantially contiguous upper surface 46, as well as debris protection, when the upper door portion 22 is removed. However, the trim caps 48 must be removed when the upper door portion 22 is coupled to the lower door portion 24. Advantageously, the upper door portion 22 includes a trim cap storage pocket assembly 50 configured to receive and store the trim caps 48 when not in use (e.g., see FIG. 6).

In one example implementation shown in FIG. 6, the trim cap storage pocket assembly 50 generally includes a trim cap storage pocket or container 52, an exterior fabric member 54, a fabric reinforcement member 56, a binding 58, and an adhesive coupling 60. In the example embodiment, storage container 52 includes walls defining a trim cap storage compartment 62 configured to receive the trim caps 48 or other objects. The storage container 52 may have one or more lids or flaps 64 configured to selectively enclose the storage compartment 62.

In the example embodiment, the exterior fabric member 54 is coupled to the upper door frame 30 and forms a portion of the outer door. The exterior fabric member 54 is coupled to (or disposed against) the fabric reinforcement member 56, for example, by the binding 58. The adhesive coupling 60 (e.g., adhesive tape) is configured to couple the fabric reinforcement member 56 to the storage container 52, the fabric reinforcement member 56, and/or the door frame 30. However, it will be appreciated that trim cap storage container 52 may be coupled to the upper door portion 22 in any suitable manner that enables door assembly to function as described herein. For example, in one alternative implementation, the storage container 52 comprises a fabric that is coupled to (e.g., sewn) to the fabric reinforcement member 56.

As shown in FIG. 6, in the example embodiment, a section of the door frame 30 may define a recess or cavity 66 configured to receive the storage container 52 therein. As such, the storage container 52 is located on an inboard side of the window 32 and exterior fabric member 54 and is configured to store trim caps 48 from the lower door portion 24 when the upper door portion 22 is installed. When a user desires to remove the upper door portion 22, thus exposing the receiving apertures 44, the user simply retrieves the trim caps 48 from the trim cap storage container 52 and installs them over the apertures 44.

Figure 7:
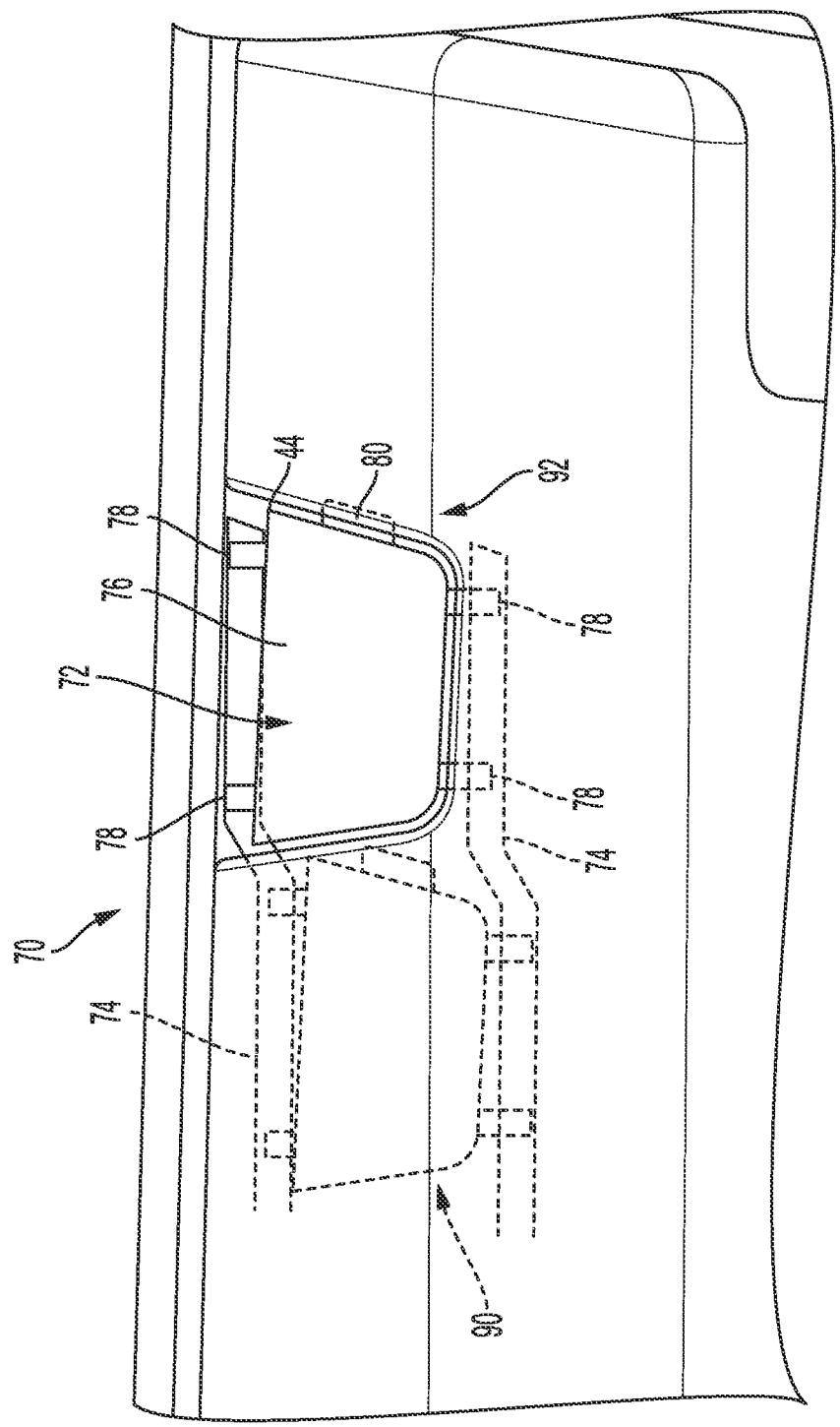
FIG. 7 is top perspective view of an example lower door portion with a sliding trim door assembly in accordance with the principles of the present disclosure.

With reference now to FIG. 7, in another embodiment, the lower door portion 24 includes one or more sliding trim door assemblies 70 configured to selectively cover and conceal the receiving apertures 44 when the upper door portion 22 is removed. In this way, the sliding trim door assemblies 70 sized and shaped to slide into aperture 44 and provide an aesthetically pleasing, contiguous or substantially contiguous upper surface 46, as well as debris protection, when the upper door portion 22 is removed.

As shown in FIG. 7, in the example embodiment, each sliding trim door assembly 70 generally includes a sliding trim cap 72 configured to slide along a track 74. In the illustrated example, the sliding trim cap 72 includes a main body 76, one or more pins 78, and one or more tabs 80. The pins 78 extend outwardly from main body 76 and are slidingly received within opposed tracks 74 formed within the lower door portion 24 (e.g., within door structure 40 and/or door trim substrate 42). As illustrated, the tabs 80 are configured to be grasped by a user to slide the trim cap 72 between a retracted position 90 (shown in phantom) and a deployed position 92 (shown in solid). In the retracted position 90, the receiving apertures 44 are exposed and able to receive the posts 34, 36 of the upper door portion 22. In the deployed position 92, the receiving apertures 44 are covered and concealed.

Described herein are systems and methods for selectively concealing receiving apertures in a lower door portion of a multi-component door. When exposed, the receiving apertures are configured to selectively receive posts of an upper door portion to thereby establish a single part door. When the upper door portion is removed, the exposed apertures are covered by trim caps. In one example, the trim caps are removable and storable within a storage pocket integrated into the upper door portion. In another example, the trim caps slide along a track to selectively close the receiving apertures. In this way, the described systems provide an elegant storage solution to prevent loss of the trim caps and provide quick access thereto.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A multi-component door assembly for a vehicle, the door assembly comprising:
   a lower door portion rotatably coupled to a body of the vehicle and including at least one receiving aperture defined therein;
   an upper door portion selectively removable from the lower door portion and including at least one post configured to be received within the at least one receiving aperture for removably coupling the upper door portion to the lower door portion; and
   at least one trim cap configured to selectively cover and conceal the at least one receiving aperture,
   wherein the at least one trim cap is slidingly coupled to the lower door portion and moves between a retracted position where the at least one receiving aperture is open to receive the at least one post, and a deployed position where the at least one trim cap covers and conceals the at least one receiving aperture.

2. The door assembly of claim 1, wherein the lower door portion includes a door trim substrate coupled to a door structure, wherein the at least one receiving aperture is formed in an upper surface of the door trim substrate.

3. The door assembly of claim 1, wherein each trim cap of the at least one trim cap includes a main body having one or more pins extending outwardly therefrom, wherein the one or more pins are slidingly received within a track formed in the lower door portion.

4. The door assembly of claim 3, wherein each trim cap further includes a tab coupled to the main body, the tab configured to be grasped by a user to slide the trim cap between the retracted and deployed positions.

5. A multi-component door assembly for a vehicle, the door assembly comprising:
   a lower door portion rotatably coupled to a body of the vehicle and including at least one receiving aperture defined therein;
   an upper door portion selectively removable from the lower door portion and including at least one post configured to be received within the at least one receiving aperture for removably coupling the upper door portion to the lower door portion; and
   at least one trim cap configured to selectively cover and conceal the at least one receiving aperture,
   wherein the upper door portion further includes a trim cap storage container configured to receive and store the at least one trim cap.

6. The door assembly of claim 5, wherein the storage container includes a lid or flap to selectively enclose a storage compartment defined by the trim cap storage container.

7. The door assembly of claim 5, wherein the upper door portion comprises:
   a frame;
   a window supported within the frame; and
   an exterior fabric member coupled to the frame.

8. The door assembly of claim 7, wherein the trim cap storage container is coupled to the frame.

9. The door assembly of claim 7, wherein the trim cap storage container is coupled to a fabric reinforcement member, which is coupled to an inboard side of the exterior fabric member.

10. The door assembly of claim 1, wherein the at least one post comprises a forward post and a rearward post.

11. A multi-component door assembly for a vehicle, the door assembly comprising:
- a lower door portion rotatably coupled to a body of the vehicle and including at least one receiving aperture defined therein;
- an upper door portion selectively removable from the lower door portion and including at least one post configured to be received within the at least one receiving aperture for removably coupling the upper door portion to the lower door portion; and
- at least one trim cap configured to selectively cover and conceal the at least one receiving aperture,
- wherein the at least one post comprises a forward post and a rearward post, and
- wherein the at least one receiving aperture includes a first receiving aperture to receive the forward post, and a second receiving aperture to receive the rearward post.

12. The door assembly of claim 11, wherein the at least one trim cap comprises a first trim cap configured to removably couple within first receiving aperture, and a second trim cap configured to removably couple within the second receiving aperture.

* * * * *